US012700513B2

(12) United States Patent
Botha et al.

(10) Patent No.: US 12,700,513 B2
(45) Date of Patent: Aug. 4, 2026

(54) NUCLEAR REACTORS HAVING LIQUID METAL ALLOY FUELS AND/OR MODERATORS

(71) Applicant: NuScale Power, LLC, Portland, OR (US)

(72) Inventors: Frederick Botha, Corvallis, OR (US); Jackson Keppen, Corvallis, OR (US); Azat Yumadilovich Galimov, Albany, OR (US); Steven M. Mirsky, Greenbelt, MD (US)

( * ) Notice: Subject to any disclaimer, the term of this patent is extended or adjusted under 35 U.S.C. 154(b) by 0 days.

(21) Appl. No.: 18/329,490

(22) Filed: Jun. 5, 2023

(65) Prior Publication Data

US 2023/0377763 A1 Nov. 23, 2023

Related U.S. Application Data

(62) Division of application No. 17/071,795, filed on Oct. 15, 2020, now Pat. No. 11,710,577.

(Continued)

(51) Int. Cl.
*G21C 1/22* (2006.01)
*G21C 11/08* (2006.01)

(Continued)

(52) U.S. Cl.
CPC .............. *G21C 1/22* (2013.01); *G21C 11/088* (2013.01); *G21C 15/257* (2013.01); *G21C 7/26* (2013.01)

(58) Field of Classification Search
CPC ................................ G21C 1/22; G21C 3/3213
See application file for complete search history.

(56) References Cited

U.S. PATENT DOCUMENTS 1,690,108 A 11/1928 Grady
3,085,966 A * 4/1963 Flora ........................ G21C 3/24 976/DIG. 31

(Continued)

FOREIGN PATENT DOCUMENTS

CA 776219 A 1/1968
CN 104759627 A 7/2015

(Continued)

OTHER PUBLICATIONS

Davis, W. E. Preliminary Design Calculations for a Fast 238U Converter. Reactor Design and Feasibility Problem. No. CF-52-8-230. Oak Ridge National Lab.(ORNL), Oak Ridge, TN (United States), 1952. (Year: 1952).*

(Continued)

*Primary Examiner* — Lily C Garner
(74) *Attorney, Agent, or Firm* — Lee & Hayes, P.C.

(57) ABSTRACT

Nuclear reactor systems and associated devices and methods are described herein. A representative nuclear reactor system includes a reactor vessel having a barrier separating a core region from a shield region. A plurality of fuel rods containing a liquid nuclear fuel are positioned in the core region. A liquid moderator material is also positioned in the core region at least partially around the fuel rods. A plurality of heat exchangers can be positioned in the shield region, and a plurality of heat pipes can extend through the barrier. The moderator material is positioned to transfer heat received from the liquid nuclear fuel to the heat pipes, and the heat pipes are positioned to transfer heat received from the moderator material to the heat exchangers. The heat exchangers can transport the heat out of the system for use in one or more processes, such as generating electricity.

15 Claims, 4 Drawing Sheets

Related U.S. Application Data

(60) Provisional application No. 62/915,482, filed on Oct. 15, 2019.

(51) Int. Cl.
*G21C 15/257* (2006.01)
*G21C 7/26* (2006.01)

(56) References Cited

U.S. PATENT DOCUMENTS

| | | | | | |
|---|---|---|---|---|---|
| 3,116,212 | A | * | 12/1963 | Lindberg, Jr. | B64D 27/22 376/350 |
| 3,152,260 | A | | 10/1964 | Cummings | |
| 3,285,822 | A | * | 11/1966 | Tunstall | G21C 7/27 376/209 |
| 3,291,698 | A | * | 12/1966 | Fortescne | G21C 3/041 376/418 |
| 3,302,042 | A | | 1/1967 | Grover et al. | |
| 3,350,272 | A | | 10/1967 | Seltorp | |
| 3,406,094 | A | * | 10/1968 | De Temple | G21C 3/041 376/418 |
| 3,446,703 | A | * | 5/1969 | Lyons | G21C 3/04 376/418 |
| 3,449,208 | A | * | 6/1969 | Cohen | G21C 1/30 376/349 |
| 3,680,284 | A | * | 8/1972 | Schmeling | G21G 1/08 376/189 |
| 3,932,217 | A | * | 1/1976 | Cachera | G21C 9/02 976/DIG. 146 |
| 4,082,863 | A | | 4/1978 | Dancy et al. | |
| 4,245,380 | A | | 1/1981 | Maxson | |
| T101,204 | I4 | | 11/1981 | Hampel | |
| 4,327,443 | A | * | 4/1982 | Cotton | G21C 1/10 976/DIG. 42 |
| 4,632,179 | A | | 12/1986 | Meijer et al. | |
| 4,717,534 | A | * | 1/1988 | Morita | G21C 3/18 376/419 |
| 4,755,350 | A | | 7/1988 | Kennel | |
| 4,851,183 | A | | 7/1989 | Hampel | |
| 4,903,761 | A | | 2/1990 | Cima | |
| 5,117,901 | A | | 6/1992 | Cullimore | |
| 5,195,575 | A | | 3/1993 | Wylie | |
| 5,647,429 | A | | 7/1997 | Oktay et al. | |
| 5,684,848 | A | | 11/1997 | Gou et al. | |
| 5,932,885 | A | | 8/1999 | Debellis et al. | |
| 6,353,651 | B1 | | 3/2002 | Gou et al. | |
| 8,073,096 | B2 | | 12/2011 | El-Genk et al. | |
| 8,532,246 | B2 | * | 9/2013 | Pomirleanu | G21C 7/10 376/333 |
| 8,675,809 | B2 | * | 3/2014 | Lahoda | G21C 3/07 376/412 |
| 9,824,890 | B2 | | 11/2017 | Young et al. | |
| 10,192,740 | B2 | | 1/2019 | Young et al. | |
| 10,497,480 | B2 | * | 12/2019 | Cheatham, III | G21C 3/18 |
| 10,643,756 | B2 | | 5/2020 | Mcclure et al. | |
| 10,878,969 | B2 | * | 12/2020 | Huke | G21D 5/08 |
| 10,903,389 | B2 | | 1/2021 | Schulte et al. | |
| 10,910,116 | B2 | | 2/2021 | Mckellar | |
| 11,158,432 | B1 | | 10/2021 | Reid et al. | |
| 2003/0141045 | A1 | | 7/2003 | Oh et al. | |
| 2008/0237032 | A1 | * | 10/2008 | Lahoda | G21C 3/07 204/192.12 |
| 2010/0040187 | A1 | | 2/2010 | Ahlfeld et al. | |
| 2010/0119027 | A1 | | 5/2010 | Peterson | |
| 2010/0177860 | A1 | * | 7/2010 | Eoh | G21C 15/18 376/299 |
| 2010/0212656 | A1 | | 8/2010 | Qiu et al. | |
| 2012/0051481 | A1 | | 3/2012 | Shu | |
| 2013/0216016 | A1 | * | 8/2013 | Journeau | G21C 9/022 376/336 |
| 2014/0169516 | A1 | * | 6/2014 | Dunavant | G21C 3/10 376/412 |
| 2014/0226775 | A1 | * | 8/2014 | Devolpi | G21G 1/08 376/189 |
| 2014/0348287 | A1 | | 11/2014 | Huke et al. | |
| 2015/0228363 | A1 | * | 8/2015 | Dewan | G21C 1/22 376/458 |
| 2015/0246394 | A1 | | 9/2015 | Lancaster-Larocque et al. | |
| 2016/0290235 | A1 | | 10/2016 | Ekanayake et al. | |
| 2016/0293281 | A1 | | 10/2016 | Katono et al. | |
| 2018/0033501 | A1 | * | 2/2018 | Kimura | G21C 3/22 |
| 2018/0075931 | A1 | | 3/2018 | Arafat et al. | |
| 2018/0182498 | A1 | * | 6/2018 | Cheatham, III | G21C 7/02 |
| 2018/0224215 | A1 | | 8/2018 | Thiers et al. | |
| 2018/0226159 | A1 | | 8/2018 | Sterbentz et al. | |
| 2018/0268948 | A1 | * | 9/2018 | Kimura | G21C 3/28 |
| 2018/0268950 | A1 | | 9/2018 | Mckellar | |
| 2021/0065921 | A1 | * | 3/2021 | Kimura | G21C 3/52 |
| 2021/0110940 | A1 | * | 4/2021 | Botha | G21C 11/088 |
| 2022/0013242 | A1 | * | 1/2022 | Huke | G21C 1/22 |
| 2022/0375632 | A1 | * | 11/2022 | Guler | G21C 7/28 |
| 2023/0197299 | A1 | * | 6/2023 | Scott | G21C 1/22 376/310 |

FOREIGN PATENT DOCUMENTS

| | | | | | |
|---|---|---|---|---|---|
| CN | 111128413 | A | | 5/2020 | |
| EP | 3406094 | A1 | | 11/2018 | |
| GB | 1197880 | A | * | 7/1970 | G21C 3/041 |
| JP | H07294174 | A | | 11/1995 | |
| JP | 2019105542 | A | | 6/2019 | |
| JP | 2021032843 | A | * | 3/2021 | G21C 1/32 |
| RU | 2650885 | C1 | | 4/2018 | |
| WO | 9708483 | A2 | | 3/1997 | |
| WO | 2009049397 | A1 | | 4/2009 | |
| WO | 2010019199 | A1 | | 2/2010 | |
| WO | WO2018229265 | A1 | | 12/2018 | |

OTHER PUBLICATIONS

Anderson, J. et al. Reactivity Control of Fast-Spectrum Reactors by Reversible Hydriding of Yttrium Zones. NASA Technical Note D-4615, 1968. 37 pages.

Datas, A. et al., "Thermophotovoltaic energy in space applications: Review and future potential." Solar Energy Materials and Solar Cells 161 (2017):285-296.

Greenspan, E. "Solid-Core Heat-Pipe Nuclear Battery Type Reactor" University of California at Berkeley, Department of Nuclear Engineering, Sep. 30, 2008. 109 pages.

ISA, International Search Report and Written Opinion for International Application No. PCT/US2020/055822. Mail Date: Apr. 23, 2021. 19 pages.

ISA, International Search Report and Written Opinion for International Patent Application No. PCT/US2020/055819. Mail Date: Mar. 5, 2021. 15 pages.

ISA, International Search Report and Written Opinion for International Patent Application No. PCT/US2021/046253. Mail Date: Dec. 9, 2021. 8 pages.

ISA, International Search Report and Written Opinion for International Patent Application No. PCT/US2021/046265. Mail Date: Feb. 18, 2022. 10 pages.

Peterson, G.P. "Introduction to Heat Pipe: Modeling, Testing, and Applications: 1st Edition" Wiley & Sons, Inc. 1994, pp. 44-76.

Rohsenow, W. et al. "Handbook of Heat Transfer: 3rd Edition" McGraw Hill, 2008, pp. 12.1-12.20.

Sterbentz, J. et al. (2017) Special Purpose Nuclear Reactor (5MW) for Reliable Power at Remote Sites Assessment Report. Idaho National Laboratory. INL/EXT-16-40741.

Vetrano, J. (1971). Hydrides as neutron moderator and reflector materials. Nuclear Engineering and Design, 14(3), pp. 390-412. Need PDF.

Wikipedia, "Hydrogen-moderated self-regulating nuclear power module" retrieved May 28, 2021 from: https://en.wikipedia.org/wiki/Hydrogen-moderated_selfregulating_nuclear_power_module#:~:text=The%20hydrogen%2Dmoderated%20self%2Dregulating,hydride%20as%20a%20neutron%20moderator. 2 pages.

(56) References Cited

OTHER PUBLICATIONS

Office Action for Japanese Application No. 2022-515580, Dated Aug. 6, 2024, 8 pages.

* cited by examiner

NUCLEAR REACTORS HAVING LIQUID METAL ALLOY FUELS AND/OR MODERATORS

CROSS-REFERENCE TO RELATED APPLICATIONS

This application is a divisional of U.S. patent application Ser. No. 17/071,795, filed on Oct. 15, 2020, which claims priority to U.S. Provisional Patent Application No. 62/915,482, filed Oct. 15, 2019, and each of which are herein incorporated by reference in their entirety.

TECHNICAL FIELD

The present technology relates generally to nuclear reactors and associated systems and methods and, more particularly, to nuclear reactors having liquid metal alloy moderators and/or liquid metal alloy fuels.

BACKGROUND

Some "small-scale" nuclear reactors are designed to provide reliable small-scale power to, for example, off-grid and/or remote locations such as mining establishments, small communities, military bases, space bases, and the like. Such small-scale nuclear reactors need to have a high power-to-mass ratio so that the reactor can provide sufficient power while also being transportable to an intended operational site. Further, small-scale off-grid reactors need to be reliable as they serve as the primary source of power in off-grid applications. Such reactors should also operate at high temperatures so that the reactor can be integrated with simple and compact power conversion systems (e.g., open or closed Brayton cycle systems), and should have a relative simple design and operation so as to provide high power reliability with competitive development and product costs.

Typically, nuclear reactors include a reflector and shield for reflecting and shielding radiation, such as neutrons, generated via fission of a fuel in an active fuel region of a core. For very small nuclear reactors, the mass of the reactor is dominated by the mass of the reflector and the shield. For example, the mass of the shield increases in cubic relation to a characteristic length (e.g., diameter) of the core. Accordingly, reducing the size of the core is essential for reducing the mass of the reflector and the shield.

Some nuclear reactors utilize a metal coolant, which typically has favorable thermal conductivity and thermal capacity properties, to enable a compact small reactor design. However, metal coolants generally do not provide neutron moderation, which is useful to reduce the amount of fuel required to sustain fission. Accordingly, such metal-cooled systems have to include a moderator, such as graphite or a metal hydride, in the core to reduce the fuel required to sustain fission. However, the addition of a moderator also increases the material in the core and with it the overall size of the core.

Additionally, nuclear reactors typically rely on control rods or control drums, which include a neutron absorber, to regulate the fission chain reaction. The inclusion of control rods—along with a mechanical system to move the rods, an instrumentation and control system to control reactivity, and the like—introduce additional failure modes in the reactor system. Addressing these failure modes in the design of the reactor system increases the complexity of the reactor and control system design.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1A:
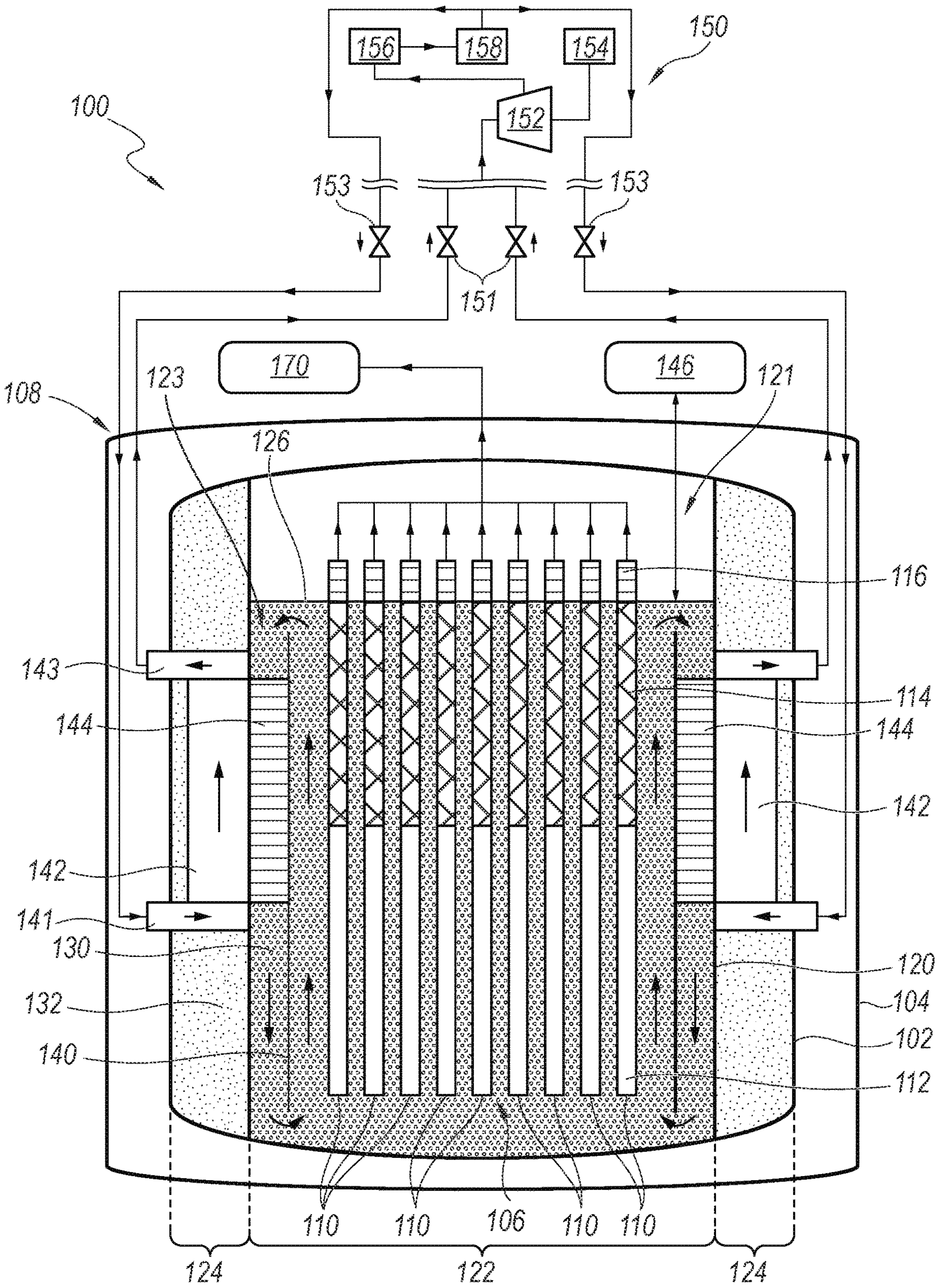
FIG. 1A is a partially schematic side cross-sectional view of a nuclear reactor system configured in accordance with embodiments of the present technology.

Aspects of the present disclosure are directed generally toward nuclear reactor systems. In several of the embodiments described below, a representative nuclear reactor system includes a reactor vessel having a barrier separating a core region from a shield region. A plurality of fuel rods containing a liquid nuclear fuel can be positioned in the core region. A liquid moderator material, such as a liquid metal alloy material, can also be positioned in the core region at least partially around the fuel rods. A plurality of heat exchangers can be positioned in the shield region, and a plurality of heat pipes can extend through the barrier. The moderator material is positioned to transfer heat received from the liquid nuclear fuel to the heat pipes, and the heat pipes are positioned to transfer heat received from the moderator material to the heat exchangers. Accordingly, the moderator material can operate as a primary coolant for transferring heat away from the fuel rods. In some embodiments, the moderator material can also control the reactivity of the liquid nuclear fuel in the fuel rods. The heat exchangers can transport the heat out of the system for use in one or more processes, such as generating electricity. In some embodiments, the nuclear reactor system can further include a hydrogen control assembly operably coupled to the core region and configured to vary a hydrogen content level of the core region to thereby control a moderating property of the moderator material.

In some embodiments, the fuel rods each include a wall defining a chamber and having a first wall portion and a second wall portion. The liquid nuclear fuel is positioned in the chamber. The first wall portion can define an active fuel region in which the liquid nuclear fuel can undergo one or more nuclear reactions. The second wall portion can include a neutron-absorbing material such that the second wall portion defines an inactive fuel region in which the liquid nuclear fuel remains subcritical. In one aspect of the present technology, the liquid nuclear fuel can freely circulate between the active and inactive regions to facilitate an even burnup of the liquid nuclear fuel.

In some embodiments, the fuel rods can further include a filter fluidly coupled to the chamber for receiving gaseous products generated by the liquid nuclear fuel. The filter can have a port for venting one or more of the gaseous products to a tank external of the nuclear reactor. The filter can further include one or more binding members positioned to capture one or more of the gaseous products via chemical bonding and/or a physical filter.

Certain details are set forth in the following description and in FIGS. 1A-2 to provide a thorough understanding of various embodiments of the present technology. In other instances, well-known structures, materials, operations, and/or systems often associated with nuclear reactors, heat pipes, heat exchangers, and so on are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope unless expressly indicated. The various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

FIG. 1A is a partially schematic side cross-sectional view of a nuclear reactor system 100 ("system 100") configured in accordance with embodiments of the present technology. In the illustrated embodiment, the system 100 includes a power module 108 including a reactor container 102 and a radiation shield container 104 surrounding/enclosing the reactor container 102. In some embodiments, the power module 108 can be mounted and submerged within a reactor pool (not shown). In some embodiments, the reactor container 102 and the radiation shield container 104 can be cylinder-shaped or capsule-shaped. A volume between the reactor container 102 and the radiation shield container 104 can be partially or completely evacuated to reduce heat transfer from the reactor container 102 to the surrounding environment (e.g., the rector pool). However, in other embodiments the volume between the reactor container 102 and the radiation shield container 104 can be at least partially filled with a gas and/or a liquid that increases heat transfer between the reactor container 102 and the radiation shield container 104.

The system 100 includes a reactor core 106 within the reactor container 102 and having one or more fuel tubes or fuel rods 110. As described in greater detail below with reference to FIG. 2, the fuel rods 110 can each hold a liquid nuclear fuel configured to generate heat via a nuclear reaction, such as a fission reaction. The number of fuel rods 110 can be varied to vary the amount of fuel in the system 100, and thus the power/heat output of the system 100. In some embodiments, the fuel rods 110 can be mounted/secured to a common frame (not shown), a portion of the reactor container 102 (e.g., a wall thereof), and/or other suitable structures within the reactor container 102. The fuel rods 110 can each include an active fuel region 112, an inactive fuel region 114, and a filter region 116.

Within the reactor container 102, a core barrier 120 (e.g., a metal wall) separates a core or moderator region 122 from a shield region 124. In some embodiments, the moderator region 122 can further include a plate 126 separating the moderator region 122 into a first volume 121 and a second volume 123. The fuel rods 110 can project at least partially through the plate 126 such that, for example, the filter regions 116 of the fuel rods 110 are positioned in the first volume 121 and the active and inactive fuel regions 112, 114 are positioned in the second volume 123. The first volume 121 can be at least partially filled with a gas (e.g., air), fluid, or other material. In some embodiments, the plate 126 can be moved vertically within the core barrier 120 to control a pressure in the first and second volumes 121, 123 by varying the relative volumes thereof.

The second volume 123 can be at least partially filled with a moderator material 130 (e.g., a primary coolant), and the shield region 124 can be at least partially filled with a shield material 132. The moderator material 130 can at least partially surround the fuel rods 110 and can transfer heat therebetween. In some embodiments, as described in greater detail below, the moderator material 130 can be a liquid metal moderator (e.g., a liquid metal alloy moderator) configured to control the reactivity of the system 100 in addition to functioning as a primary coolant. The shield material 132 can absorb and/or reflect radiation generated by fissioning the fuel in the reactor core 106 (e.g., neutrons and/or other particles) during operation of the system 100. For example, the shield material 132 can be a liquid metal material (e.g., a liquid metal alloy including bismuth and/or boron oxide). In some embodiments, the moderator material 130 can further act as a reflector that slows down neutrons and/or other particles to increase/improve their absorption by the shield material 132.

The system 100 can further include a flow shroud 140 positioned in the second volume 123 around the fuel rods 110, and one or more heat exchangers 142 positioned in the shield region 124 (e.g., circumferentially about the shield region 124). One or more heat pipes 144 can extend (i) from, at, or proximate the flow shroud 140, (ii) at least partially through the core barrier 120, and (iii) to, at, or proximate corresponding ones of the heat exchangers 142. The heat pipes 144 can each include/contain a first working fluid (e.g., a secondary coolant). In some embodiments, the working fluid can be a two-phase metal (e.g., liquid and vapor phase) such as, for example, sodium or potassium. The heat pipes 144 can further include one or more wicks configured to pump the working fluid in the liquid phase against a pressure gradient in the heat pipes 144. In some embodiments, the heat pipes 144 can include features generally similar or identical to those of the heat pipes described in detail in concurrently-filed U.S. Patent Application by Frederick Botha, titled "HEAT PIPE NETWORKS FOR HEAT REMOVAL, SUCH AS HEAT REMOVAL FROM NUCLEAR REACTORS, AND ASSOCIATED SYSTEMS AND METHODS," assigned to NuScale Power, LLC, and identified by U.S. patent application Ser. No. 17/071,838, which is incorporated herein by reference in its entirety.

The heat pipes 144 can thermally couple the reactor core 106 to the heat exchangers 142, which direct heat generated in the reactor core 106 to a power conversion system 150. The power conversion system 150 can generate electrical power and/or provide other useful outputs. In other embodiments, the system 100 can include one or more thermal transfer devices other than heat pipes that are configured to thermally couple the reactor core 106 and the heat exchangers 142 and transfer heat therebetween. In some embodiments, the heat exchangers 142 can each include one or more helically-coiled conduits (e.g., tubes) that include/carry a working fluid (e.g., a tertiary coolant such as water) that carries the heat from the reactor core 106 out of the power module 108 to the power conversion system 150.

During system operation, the fuel in the active fuel regions 112 of the fuel rods 110 can heat the moderator material 130, which naturally develops a thermal gradient (e.g., as illustrated by arrows located within the second volume 123 of the reactor container 102) and conveys heat to the heat pipes 144. More specifically, the fuel rods 110 can heat the moderator material 130 near a bottom of the reactor container 102 near the active fuel regions 112. The heated moderator material 130 then rises through the second volume 123 inward of the flow shroud 140 and toward the plate 126, where it is directed outward into the space between the flow shroud 140 and the core barrier 120. The moderator material 130 then descends through/past the heat pipes 144, transferring heat to the working fluid within the heat pipes 144 and causing the working fluid to evaporate/vaporize (e.g., in an evaporator region of the heat pipes 144). The moderator material 130 then descends to the bottom of the reactor container 102 where the cycle begins again. In one aspect of the present technology, the cycle is driven by the changes in the buoyancy of the moderator material 130, thus reducing or eliminating the need for pumps to move the moderator material 130.

The evaporated working fluid in the heat pipes 144 flows outward through the heat pipes 144 (e.g., through an adiabatic region of the heat pipes 144) toward the heat exchangers 142, where the working fluid cools and condenses (e.g., at a condenser region of the heat pipes 144), transferring heat to the heat exchangers 142. The one or more wicks in the heat pipes 144 then transport the condensed/cooled working fluid inward against the pressure gradient in the heat pipes 144 to the evaporator region of the heat pipes 144 where the working fluid can be heated and vaporized once again. In some embodiments, the heat exchangers 142 can be directly coupled/attached to a corresponding one or more of the heat pipes 144 and/or their supporting structure while, in other embodiments, the heat exchangers 142 can be spaced apart from the heat pipes 144 in the shield region 124. For example, the shield material 132 can act as a heat transfer medium for transferring heat from the heat pipes 144 to the heat exchangers 142. In one aspect of the present technology, the thermal properties of the shield material 132 can help distribute heat around the heat exchangers 142, thereby reducing the likelihood for the heat exchangers 142 to fail (e.g., due to over pressurization) that could otherwise occur from a failure of any of the heat pipes 144. In another aspect of the present technology, the heat pipes 144 can reduce the overall footprint (e.g., size) of the system 100.

In the illustrated embodiment, the heat exchangers 142 each include a liquid header 141 at which the working fluid (e.g., water, gas, vapor) enters the heat exchanger 142 in a liquid state. The working fluid rises from the liquid header 141 through the conduits of the heat exchanger 142, where it is heated by the heat conveyed outward from the reactor core 106 by the heat pipes 144. The working fluid converts to vapor (e.g., steam) as it rises through the conduits. The vaporized working fluid is then collected at a vapor header 143 where it is directed out of the power module 108 to the power conversion system 150. The liquid header 141 and the vapor header 143 are not shown in FIGS. 1B and 1C for the sake of clarity.

The power conversion system 150 can include one or more vapor valves 151 that regulate the passage of high pressure, high temperature vapor from the heat exchangers 142 to a turbine 152. The turbine 152 can convert the thermal energy of the vapor to electricity via a generator 154. The low pressure vapor exiting the turbine 152 can be condensed at a condenser 156, and then directed (e.g., via a pump 158) to one or more liquid valves 153. The liquid valves 153 are configured to control the rate at which the working fluid re-enters the heat exchangers 142 via the liquid headers 141.

In some embodiments, the moderator material 130 can comprise a liquid meatal material such as, for example, a liquid metal hydride that can be used to control the reactivity of the fuel rods 110 by adding or removing hydrogen from the system 100. More particularly, the moderator material 130 can be a mixture of calcium hydride (e.g., $CaH_2$), calcium bismuth (Bi—Ca), calcium lead (Pb—Ca) and/or other suitable compounds. Such mixtures can undergo reversible conversions between metal and metal hydride based on the hydrogen content of the system 100 and, accordingly, can be used as a moderator to control a reactivity of the fuel in the fuel rods 110 based on the state of the moderator material 130. For example, in some embodiments the system 100 can include a hydrogen control system 146 configured to vary a hydrogen content level of the moderator region 122 to thereby control the state of the moderator material 130 and thus its moderating properties. More specifically, for example, the hydrogen control system 146 can vary a hydrogen gas pressure in the first volume 121 above the moderator material 130, which acts to vary the hydrogen content of the moderator material 130. For space applications, where without gravity the gas volume in the first volume 121 cannot be maintained as a separate region at the top of the reactor container 102, the hydrogen gas volume can be contained in an enclosed expandable volume separated from the moderator material 130 by a membrane or other member configured to selectively pass hydrogen therethrough. In some embodiments, the hydrogen control system 146 can alternatively or additionally vary the hydrogen content of the moderator material 130 by directly adding metal hydride into the moderator material 130 while maintaining a pressure within the moderator region 122 that is above the dissociation pressure, thereby increasing (i) the mass fraction of the metal hydride and (ii) the neutron moderation and reactivity of the system 100.

In some embodiments, the hydrogen control system 146 can slowly adjust the hydrogen content of the moderator material 130 over the life of the reactor core 106 to account for burnup of the fuel within the fuel rods 110. As described in detail above, the moderator material 130 also acts as a primary coolant for transferring heat from the reactor core 106 to the heat pipes 144. Accordingly, in contrast to some conventional nuclear reactors, the system 100 does not require a separate moderator from the coolant to control the reactivity of the reactor core 106, thereby reducing the amount of material and overall size of the reactor core 106.

In one aspect of the present technology, the moderator material 130 passively regulates the reactivity of the reactor core 106. For example, if the heat pipes 144, heat exchangers 142, and/or other heat removal components of the system 100 fail, the moderator material 130 will increase in temperature. As the moderator material 130 increases in temperature (and decreases in density), (i) the neutron absorbency of the moderator material 130 can increase and (ii) the capacity for the moderator material 130 to absorb hydrogen can decrease (e.g., as the hydrogen boils from the moderator solution). These changes in the properties of the moderator material 130 can passively reduce the power output of the reactor core 106. In addition to the moderator material 130, the system 100 can include one or more control rods (not shown), such as a boron control rod, configured to absorb (e.g., poison) neutrons in the moderator region 122 that may otherwise induce fission of the fuel in the fuel rods 110. Such control rods can help facilitate startup and shutdown of the system 100.

Figure 1B:
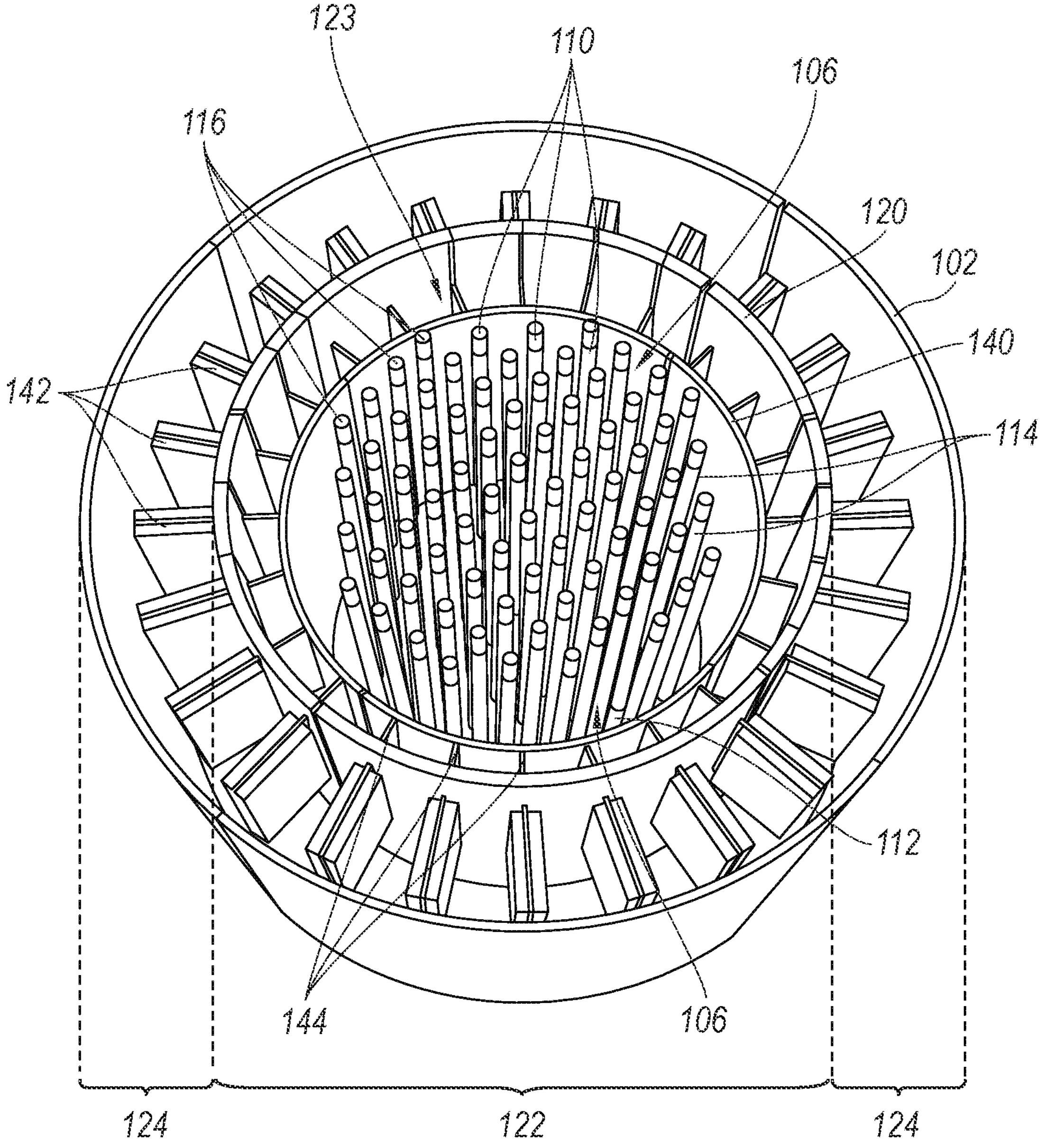
FIGS. 1B and 1C are an isometric top view and an enlarged side cross-sectional view, respectively, of a reactor vessel of the nuclear reactor system configured in accordance with embodiments of the present technology.
Figure 1C:
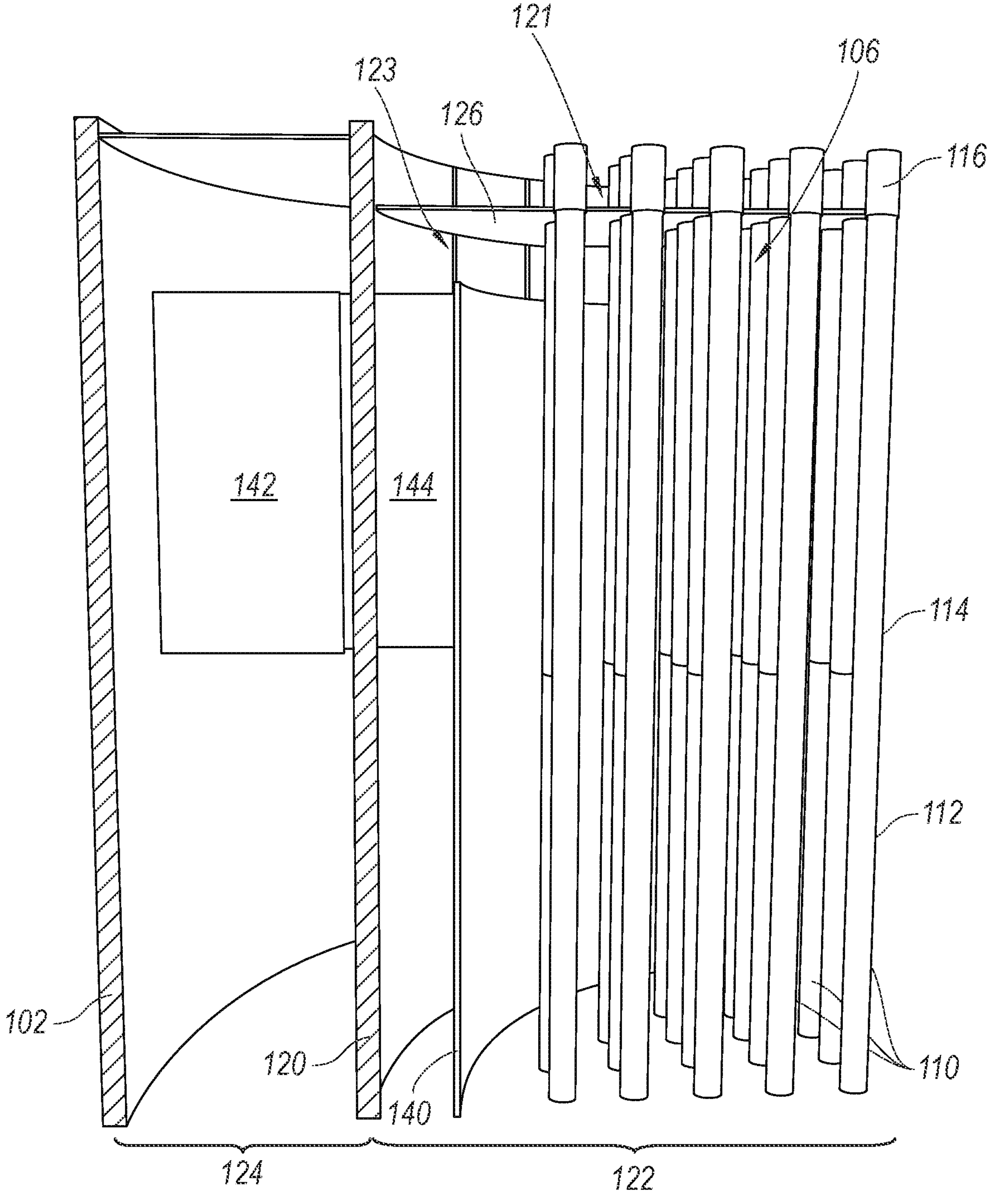

FIGS. 1B and 1C are an isometric top view and an enlarged side cross-sectional view, respectively, of the reactor container 102 configured in accordance with embodiments of the present technology. Referring to FIGS. 1B and 1C together, the reactor container 102, the core barrier 120, and the flow shroud 140 can each have a circular cross-sectional shape, and the fuel rods 110 can be arranged in the region inward of the flow shroud 140. The heat pipes 144 can be arranged circumferentially in the moderator region 122 between the flow shroud 140 and the core barrier 120. Similarly, the heat exchangers 144 can be arranged circumferentially in the shield region 124 between the core barrier 120 and the reactor container 102.

Figure 2:
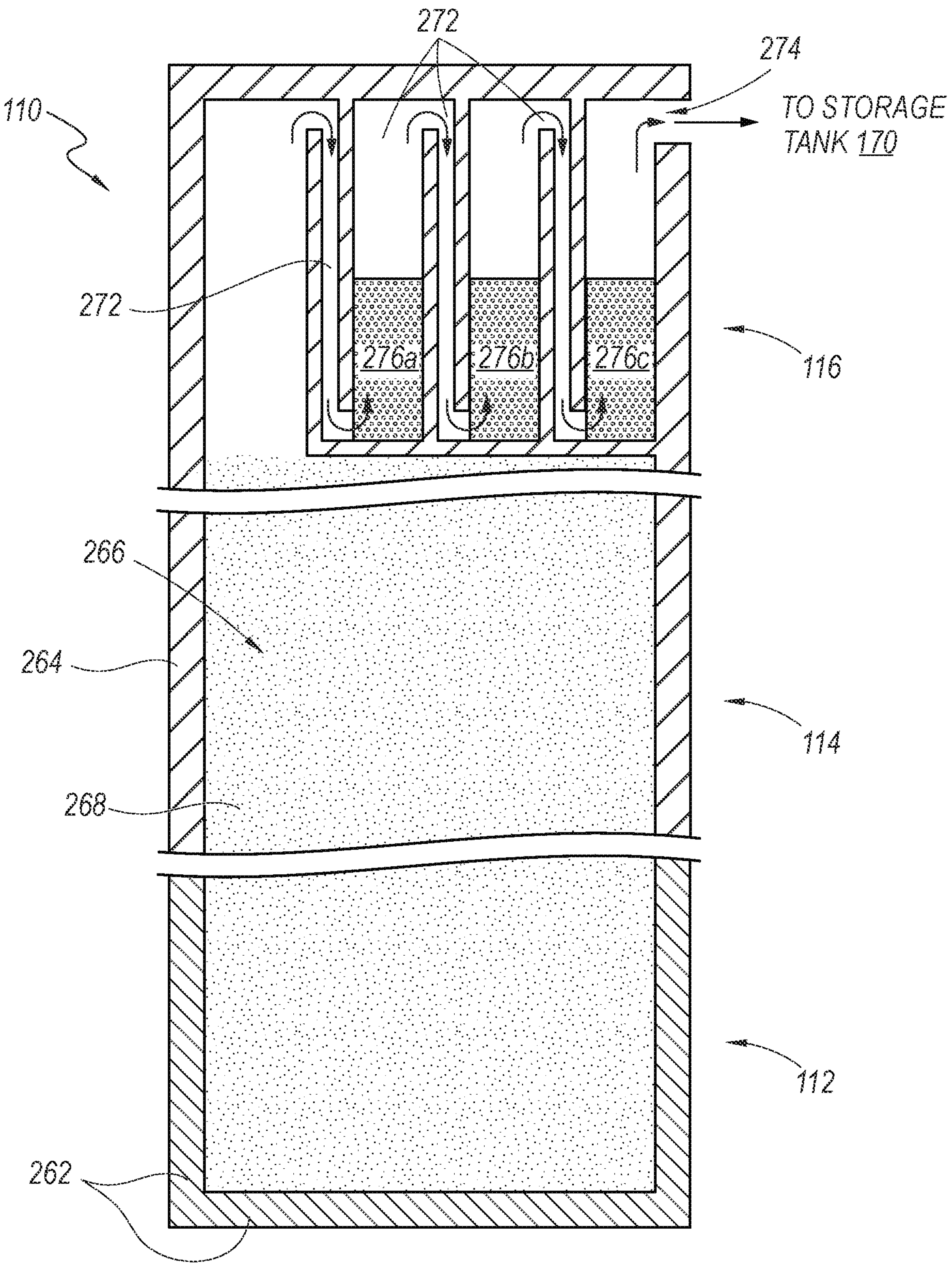
FIG. 2 is a cross-sectional side view of a fuel rod of the nuclear reactor system configured in accordance with embodiments of the present technology.

FIG. 2 is a cross-sectional side view of one of the fuel rods 110 configured in accordance with embodiments of the present technology. In the illustrated embodiment, the fuel rod 110 is or includes a tube having a first wall portion 262 and a second wall portion 264 that together enclose/define a chamber 266. A liquid nuclear fuel 268 at least partially fills the chamber 266. The fuel rod 110 separates the liquid nuclear fuel 268 from the moderator material 130 (FIGS. 1A-1C) to provide a heterogeneous fuel-moderator assembly in the reactor core 106 (FIGS. 1A-1C). The filter region 116 can be formed integrally with the first and second wall portions 262, 264 or can be a separate component attached thereto. The filter region 116 can be fluidly coupled to the chamber 266 but, in some embodiments, the liquid nuclear fuel 268 does not fill the filter region 116. That is, a volume of the liquid nuclear fuel 268 can be selected such that the liquid nuclear fuel 268 has a liquid level below the filter region 116. In some embodiments, a single filter region 116 can be fluidly coupled to multiple ones of the fuel rods 110.

The first wall portion 262 defines the active fuel region 112, and the second wall portion 264 defines the inactive fuel region 114. The first and second wall portions 262, 264 are formed from one or more materials that are resistant to high temperatures and high radiation levels, such as magnesium oxide (MgO). In some embodiments, the first and second wall portions 262, 264 can have different concentrations/amounts of one or more neutron-absorbing material (e.g., poisons). For example, the second wall portion 264 can include a greater amount of neutron-absorbing material integrated therein than the first wall portion 262. In some embodiments, the first wall portion 262 does not include any neutron-absorbing material therein. The neutron-absorbing material in the second wall portion 264 can inhibit the liquid nuclear fuel 268 from reacting (e.g., undergoing fission) in the inactive fuel region 114. Thus, the inactive fuel region 114 keeps the liquid nuclear fuel 268 subcritical, and the liquid nuclear fuel 268 reacts (e.g., reaches criticality) only in the active fuel region 112. In the illustrated embodiment, the active fuel region 112 is positioned below the inactive fuel region 114 while, in other embodiments, the active fuel region 112 can be positioned above the inactive fuel region 114 and/or the fuel rod 110 can include multiple active and inactive fuel regions interspersed with one another. In some embodiments, the inactive fuel region 114 can function as a neutron reflector and/or a neutron shield.

The liquid nuclear fuel 268 can comprise, for example, a uranium-iron liquid metal (UI-LM) alloy. In some embodiments, the UI-LM can have a reduced melting point relative to uranium (e.g., as low as 725° C.) and can be enriched to 19.5 wt % or less uranium-235 (U-235) when using low enriched uranium. Referring to FIGS. 1A-2 together, in some embodiments the active fuel regions 112 of the fuel rods 110 are sized to contain a minimum volume of the liquid nuclear fuel 268 required to maintain criticality in the reactor core 106. The inactive fuel regions 114 of the fuel rods 110 can contain more of the liquid nuclear fuel 268 for sustaining criticality of the reactor core 106 over its lifetime. In one aspect of the present technology, the liquid nuclear fuel 268 allows for circulation of the fuel between the active and inactive fuel regions 112, 114 such that the volume of the liquid nuclear fuel 268 is burned generally uniformly. That is, the liquid nuclear fuel 268 in the inactive fuel regions 114 is still available for power generation.

In some embodiments, volatile and gaseous fission products, such as xenon gas, can escape from the liquid nuclear fuel 268 during operation. The filter regions 116 of the fuel rods 110 are configured to capture such fission products and/or vent the fission products to one or more storage tanks 170 (FIG. 1A) positioned external to the power module 108 for absorption and retention at lower temperatures. For example, gaseous fission products such as xenon isotopes and krypton can be pressurized and stored outside of the power module 108 in the storage tank 170. In one aspect of the present technology, venting fission products from the reactor core 106 allows the pressure in the fuel rods 110 to remain low during operation of the system 100. In other embodiments, the fuel rods 110 need not be coupled to the storage tank 170 or any other external storage locations.

Referring again to FIG. 2, the filter region 116 can define a flow path 272 between the chamber 266 and a vent port 274 fluidly coupled to the storage tank 170 (FIG. 1A) and/or other ventilations systems. In the illustrated embodiment, the flow path 272 has a serpentine shape (e.g., including a plurality of linear segments). In other embodiments, the flow path 272 can have other shapes (e.g., curved, linear) and can include more or fewer segments. The filter region 116 can further include one or more filter members 276 (identified individually as first through third filter members 276*a*-276*c*, respectively) positioned in/along the flow path 272. The filter members 276 can be configured to capture fission products produced by the liquid nuclear fuel 268. The filter members 276 can include components for binding to certain fission products and/or can include physical filtering components for capturing non-reactive fission products (e.g., noble gases). The filter members 276 can include solid and/or liquid surfaces for capturing fission products and, in some embodiments, can be configured to withstand and remove heat from the decaying fission products. For example, the filter members can be large enough to effectively remove heat from the captured and decaying fission products.

In some embodiments, the filter members 276 are each configured to capture a different fission product. For example, the first filter member 276*a* can be selected such that a first fission product is physically captured by or chemically binds thereto, the second filter member 276*b* can be selected such that a second fission product is physically captured by or chemically binds thereto, and so on. Accordingly, in one aspect of the technology the filter regions 116 facilitate the capture/ventilation of fission products in a way that reduces the possibility of an uncontrolled release of fission products upon the failure of any of the fuel rods 110.

Referring to FIGS. 1A-2 together, in another aspect of the present technology the filter regions 116 can remove fission products (e.g., poisons) from the reactor core 106 that decrease the reactivity of the liquid nuclear fuel 268, such as high-neutron absorbing isotopes of xenon. By dynamically removing such poisons from the reactor core 106, the reactor core 106 requires less fuel for the same lifetime power output compared to conventional nuclear reactors in which poisonous fission products remain in the core. Removing such poisons from the reactor core 106 also simplifies the passive reactivity control of the system 100, as less additional positive reactivity (e.g., a move toward supercriticality) is needed to compensate for changes in the concentration of neutron-absorbing materials (e.g., neutron poisons) in the core. That is, the reactor core 106 can be operated with less excess reactivity compared to conventional nuclear reactors while still producing the same power output. Further, the need for controlling reactivity changes to account for a change in xenon concentration from changes in power level (e.g., xenon transients) can be reduced or eliminated when xenon is continuously removed from the fuel. Without the presence of xenon, the amount of hydrogen does not have to be adjusted when changing the power level in the core. In some aspects of the present technology, this allows for controlling reactor power simply by adjusting the amount of heat that is removed from the reactor—that is, the reactivity of the reactor core 106 can be passively controlled.

The following examples are illustrative of several embodiments of the present technology:

1. A nuclear reactor, comprising:
   - a reactor vessel including a barrier separating a core region from a shield region;
   - a fuel rod in the core region and containing a liquid nuclear fuel;
   - a moderator material in the core region and at least partially surrounding the fuel rod;
   - a thermal transfer device extending at least partially through the barrier, wherein the moderator material is positioned to transfer heat received from the liquid nuclear fuel to the thermal transfer device; and
   - a hydrogen control assembly operably coupled to the core region, wherein the hydrogen control assembly is configured to vary a hydrogen content level of the core region to thereby control a moderating property of the moderator material.
2. The nuclear reactor of example 1 wherein the moderator material includes a liquid metal alloy material.
3. The nuclear reactor of example 1 or example 2 wherein the moderator material includes a liquid metal hydride.
4. The nuclear reactor of any one of examples 1-3, further comprising a shield material in the shield region, wherein the shield material is configured to absorb and/or reflect neutrons generated by the liquid nuclear fuel.
5. The nuclear reactor of example 4, further comprising a heat exchanger in the shield region, wherein the thermal transfer device is positioned to transfer heat received from the moderator material to the heat exchanger, and wherein the shield material is a liquid positioned to transfer heat received from the thermal transfer device to the heat exchanger.
6. The nuclear reactor of example 5 wherein the shield material includes a liquid metal material.
7. The nuclear reactor of any one of examples 1-6 wherein the fuel rod includes a filter positioned to vent gaseous products generated by the liquid nuclear fuel to outside of the reactor vessel.
8. The nuclear reactor of any one of examples 1-7 wherein the fuel rod includes a filter positioned to receive gaseous products generated by the liquid nuclear fuel, and wherein the filter includes a filter member positioned to capture one or more of the gaseous products.
9. The nuclear reactor of any one of examples 1-8 wherein the fuel rod includes a filter positioned to receive gaseous products generated by the liquid nuclear fuel, wherein the filter defines a serpentine flow path, and wherein the filter includes multiple filter members positioned along the serpentine flow path to capture one or more of the gaseous products.
10. The nuclear reactor of any one of examples 1-9 wherein the fuel rod includes a filter positioned to vent gaseous products generated by the liquid nuclear fuel to outside of the reactor vessel, and wherein the filter includes a filter member positioned to capture one or more of the gaseous products.
11. The nuclear reactor of any one of examples 1-10, further comprising a plurality of heat exchangers, wherein the thermal transfer device includes a plurality of heat pipes positioned to transfer the heat received from the moderator material to corresponding ones of the heat exchangers.
12. The nuclear reactor of any one of examples 1-11, further comprising a heat exchanger positioned in the shield region, wherein the thermal transfer device is positioned to transfer heat received from the moderator material to the heat exchanger.
13. A nuclear reactor, comprising:
   - a reactor vessel including a barrier separating a core region from a shield region;
   - a fuel rod in the core region and containing a liquid nuclear fuel;
   - a liquid metal alloy material in the core region and at least partially surrounding the fuel rod, wherein the liquid metal alloy material is configured to control a reactivity of the core region; and
   - a thermal transfer device extending at least partially through the barrier, wherein the liquid metal alloy material is positioned to transfer heat received from the liquid nuclear fuel to the thermal transfer device.
14. The nuclear reactor of example 13 wherein the liquid metal alloy material includes a liquid metal hydride, and wherein the nuclear reactor further comprises a hydrogen control assembly fluidly coupled to the core region of the reactor vessel, wherein the hydrogen control assembly is operable to vary a hydrogen content level of the liquid metal hydride to thereby control the reactivity of the core region.
15. The nuclear reactor of example 13 or example 14, further comprising a heat exchanger positioned in the shield region, wherein the thermal transfer device is positioned to transfer heat received from the liquid metal alloy material to the heat exchanger.
16. A fuel rod for a nuclear reactor, comprising:
   - a wall defining a chamber; and
   - a filter fluidly coupled to the chamber for receiving gaseous products generated by the liquid nuclear fuel, wherein the filter includes a port positioned to vent one or more of the gaseous products from the chamber, and wherein the filter includes a filter member positioned to capture one or more of the gaseous products.

17. The fuel rod of example 16 wherein the wall includes a first wall portion and a second wall portion, wherein the first wall portion includes a greater amount of a neutron-absorbing material than the second wall portion.
18. The fuel rod of example 17 further comprising a liquid nuclear fuel in the chamber, wherein the liquid nuclear fuel remains subcritical proximate the first wall portion.
19. The fuel rod of any one of examples 16-18 wherein the filter defines a serpentine flow path, wherein the filter member is positioned along the flow path, and wherein the filter member is configured to physically capture one or more of the gaseous products.
20. The fuel rod of any one of examples 16-19 wherein the filter member is configured to bind to one or more of the gaseous products.
21. A nuclear reactor, comprising:
a reactor vessel including a barrier separating a core region from a shield region;
a fuel rod in the core region and containing a liquid nuclear fuel;
a liquid moderator material in the core region and at least partially surrounding the fuel rod;
a heat exchanger; and
a heat pipe extending at least partially through the barrier, wherein the liquid moderator material is positioned to transfer heat received from the liquid nuclear fuel to the heat pipe, and wherein the heat pipe is positioned to transfer heat received from the moderator material to the heat exchanger.
22. The nuclear reactor of example 21 wherein the liquid metal alloy material includes a liquid metal hydride, and wherein the nuclear reactor further comprises a hydrogen control assembly fluidly coupled to the core region of the reactor vessel, wherein the hydrogen control assembly is operable to vary a hydrogen content level of the liquid metal hydride to thereby control a reactivity of the liquid nuclear fuel.
23. A method of operating a nuclear reactor, the method comprising:
generating heat in a reactor core via a nuclear reaction of a liquid nuclear fuel contained in a fuel rod;
conveying, via a liquid metal alloy moderator material, heat received from the reactor core to a heat pipe;
conveying, via the heat pipe, heat received from the liquid metal alloy moderator material to a heat exchanger; and
conveying, via the heat exchanger, heat received from the heat pipe to a power conversion system.
24. The method of example 23 wherein the method further comprises venting, from the fuel rod, one or more products generated by the nuclear reaction of the liquid nuclear fuel.
25. The method of example 23 or example 24 wherein the method further comprises capturing, in a filter portion of the fuel rod, one or more products generated by the nuclear reaction of the liquid nuclear fuel.
26. The method of any one of examples 23-25 wherein the fuel rod includes an active fuel region and an inactive fuel region, and wherein the method further comprises circulating the liquid nuclear fuel between the active fuel region and the inactive fuel region.
27. The method of any one of examples 23-26 wherein the method further comprises controlling a hydrogen content level of the liquid metal alloy moderator material to thereby control a reactivity of the liquid nuclear fuel.
28. The method of example 27 wherein the liquid metal alloy includes a liquid metal hydride.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, other embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and both A and B. To the extent any materials incorporated herein by reference conflict with the present disclosure, the present disclosure controls. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. For example, referring to FIGS. 1A-2 together, the fuel rods 110 can be configured to hold a solid nuclear fuel. In some embodiments, the fuel rods 110 can be incorporated into nuclear reactors having other configurations and/or components. In some embodiments, the filter regions 116 of the fuel rods 110 can have other flow paths (e.g., non-serpentine flow paths), capture materials, and the like.

We claim:

1. A fuel rod for a nuclear reactor, comprising:
a first wall portion defining an active region of a chamber configured to contain a first portion of liquid nuclear fuel in a critical state;
a second wall portion defining an inactive region of the chamber configured to contain a second portion of liquid nuclear fuel, wherein the second wall portion includes an amount of a neutron-absorbing material integrated therein configured to keep the second portion of the liquid nuclear fuel inside the inactive region in a subcritical state, wherein the amount of the neutron-absorbing material is in contact with, and encloses, the second portion of liquid nuclear fuel, and wherein the second wall portion is positioned above the first wall portion, wherein the liquid nuclear fuel is configured to circulate within the chamber between the inactive region and the active region such that the liquid nuclear fuel is burned generally uniformly; and
a filter fluidly positioned above the inactive region and coupled to the chamber for receiving gaseous products generated by the liquid nuclear fuel.

2. The fuel rod of claim 1, wherein the filter is integrally formed with the second wall portion.

3. The fuel rod of claim 1, wherein the gaseous products comprise xenon and/or krypton.

4. The fuel rod of claim 1, wherein the filter defines a serpentine flow path from the chamber to a port.

5. The fuel rod of claim 1, wherein the liquid nuclear fuel is a uranium-iron liquid metal (UI-LM) alloy.

6. The fuel rod of claim 5, wherein the UI-LM alloy is enriched to 19.5 weight percentage or less uranium-235 (U-235).

7. A fuel rod for a nuclear reactor, the fuel rod comprising:

a first wall portion defining an active region of a chamber configured to contain a first portion of liquid nuclear fuel, the first portion of liquid nuclear fuel being configured to undergo a fission reaction within the active region that generates heat and one or more fission products;

a second wall portion defining an inactive region of the chamber configured to contain a second portion of the liquid nuclear fuel, wherein the second wall portion includes an amount of a neutron-absorbing material integrated therein configured to keep the second portion of the liquid nuclear fuel inside the inactive region in a subcritical state, wherein the amount of the neutron-absorbing material is in contact with the second portion of liquid nuclear fuel, and wherein the second wall portion is positioned above the first wall portion, wherein the liquid nuclear fuel is configured to circulate within the chamber between the inactive region and the active region; and a filter fluidly coupled to the chamber for receiving the fission products released from the liquid nuclear fuel.

8. The fuel rod of claim 7, wherein the fission products comprise noble gases.

9. The fuel rod of claim 7, wherein the filter comprises a first filter member configured to physically capture a first fission product of the fission products and a second filter member configured to chemically bind a second fission product of the fission products.

10. The fuel rod of claim 7, wherein the filter defines a serpentine flow path.

11. The fuel rod of claim 1, wherein the first portion of the liquid nuclear fuel in the critical state comprises a minimum volume of the liquid nuclear fuel required to maintain criticality in a reactor core that contains the fuel rod.

12. The fuel rod of claim 1, wherein the second wall portion includes a greater amount of a neutron-absorbing material than the first wall portion.

13. The fuel rod of claim 1, wherein the filter defines a flow path from the chamber through a first filter member and a second filter member to a port, the port being positioned to vent one or more of the gaseous products from the chamber.

14. The fuel rod of claim 1, wherein the second wall portion functions as a neutron reflector or a neutron shield.

15. The fuel rod of claim 1, wherein the liquid nuclear fuel is configured to circulate between the inactive region and the active region and wherein the liquid nuclear fuel reacts only in the active region such that the liquid nuclear fuel is burned generally uniformly.

* * * * *